US012307277B2

(12) United States Patent
Janakiram et al.

(10) Patent No.: US 12,307,277 B2
(45) Date of Patent: May 20, 2025

(54) METHOD FOR OPTIMIZING THE LOAD BALANCE IN THE CLUSTER AND FRAMEWORK THEREOF

(71) Applicant: Indian Institute of Technology Madras (IIT Madras), Tamil Nadu (IN)

(72) Inventors: Dharanipragada Janakiram, Tamil Nadu (IN); Akshay Dhumal, Tamil Nadu (IN)

(73) Assignee: Indian Institute of Technology Madras (IIT Madras), Tamil Nadu (IN)

( * ) Notice: Subject to any disclaimer, the term of this patent is extended or adjusted under 35 U.S.C. 154(b) by 812 days.

(21) Appl. No.: 17/484,396

(22) Filed: Sep. 24, 2021

(65) Prior Publication Data
US 2022/0091874 A1     Mar. 24, 2022

(30) Foreign Application Priority Data

Sep. 24, 2020  (IN) ............................. 202041041427

(51) Int. Cl.
*G06F 9/455*         (2018.01)
*G06F 9/48*          (2006.01)
(Continued)

(52) U.S. Cl.
CPC ........ *G06F 9/45558* (2013.01); *G06F 9/4856* (2013.01); *G06F 9/5088* (2013.01);
(Continued)

(58) Field of Classification Search
None
See application file for complete search history.

(56) References Cited

U.S. PATENT DOCUMENTS 10,162,559 B2 * 12/2018 Makin .................. G06F 3/0647
10,664,186 B2 *  5/2020 Makin .................. H04L 67/142
(Continued)

OTHER PUBLICATIONS

Mirkin et al., "Containers checkpointing and live migration", Jul. 2008, Procceedings of Linux Symposium, vol. Two, pp. 85-92. (Year: 2008).*

(Continued)

*Primary Examiner* — Qing Yuan Wu
(74) *Attorney, Agent, or Firm* — Polsinelli PC; Babk Monajemi; Ryan Murphy

(57) ABSTRACT

The present disclosure provides a framework (120) and a method of optimizing load balancing in a cluster by effectively migrating docker containers which leverages the container runtime real-time metrics of the computing host machine in the virtual environment to decide the optimal container to node placement in the cluster. The present disclosure uses fly container migration in which migrating a container involves check-pointing it on the host node and restoring it on the target node, it also enables synchronizing the container file system, by leveraging the use of private container registry. Load balancing of the instant disclosure is performed by optimized allocation of nodes in the applications thereby re-balancing the cluster and further the framework is scalable to large number of nodes and it leverages the power of graphical processing units (GPU) for making faster scheduling decisions.

18 Claims, 11 Drawing Sheets

(51) Int. Cl.
*G06F 9/50* (2006.01)
*G06F 16/178* (2019.01)
(52) U.S. Cl.
CPC .. *G06F 16/178* (2019.01); *G06F 2009/45562* (2013.01); *G06F 2009/4557* (2013.01); *G06F 2009/45575* (2013.01)

(56) References Cited

U.S. PATENT DOCUMENTS

| | | |
|---|---|---|
| 11,055,012 B2 * | 7/2021 | Makin ................ H04L 67/34 |
| 2018/0074748 A1 | 3/2018 | Makin et al. |
| 2020/0192689 A1 * | 6/2020 | Smith, IV ............ G06F 16/178 |
| 2020/0356397 A1 * | 11/2020 | Kumatagi ........... G06F 9/45558 |

OTHER PUBLICATIONS

Huang et al., "FastBuild: Accelerating Docker Image Building for Efficient Development and Deployment of Container", 2019, IEEE, 2019 35th Symposium on Mass Storage Systems and Technologies, pp. 28-37. (Year: 2019).*

Intellectual Property Office of India Examination Report; dated Aug. 8, 2022; Application # 202041041427.

* cited by examiner

METHOD FOR OPTIMIZING THE LOAD BALANCE IN THE CLUSTER AND FRAMEWORK THEREOF

CROSS-REFERENCE TO RELATED APPLICATIONS

This application claims priority to Indian Application No. 202041041427, filed on Sep. 24, 2020, the entirety of which is herein incorporated by reference.

FIELD OF DISCLOSURE

The present disclosure relates to the field of distributed computing system and in particular, to system and method of optimizing load balance in the cluster by effectively migrating docker containers thereby leveraging the container runtime real-time metrics to decide the optimal container to node placement in the cluster.

BACKGROUND

During early days of the World Wide Web manifestation of the internet, there was a one-to-one relationship between web site and computer. For each web site, there was a single computer, called a "web server" that hosted the web site. The web site had a single IP address associated with the site's single computer. Now the popularity of internet has become ubiquitous. For many web sites, a single computer does not serve the volumes of activity that con-currently takes place and certainly cannot scale to handle the incoming volumes. Any organization which hosts network-connected applications, typically include one or more dedicated computer servers for each application being run, and are often designed to include an excessive allocation of resources in order to handle peak demands. Modern servers must address millions of parallel requests from users and return the correct data in a fast and reliable manner. To effectively meet these high volumes, modern computing generally requires adding more servers. Such partitioning of computer systems through dedicated servers and excessive allocation of resources can be costly, inefficient, difficult to scale and manage, and often faces a major issue of load balancing problem. Load generated by applications vary significantly over time, a website can experience a spike in traffic requiring the applications to be moved between servers in order to maintain an acceptable level of utilization. This is called as the load-balancing problem.

Load balancing is a methodical and efficient distribution of network or application traffic across multiple servers in a server farm. A load balancer stands in-between the user devices and servers routing and then distributing the client requests across all available servers capable of fulfilling those requests in a manner that maximizes speed and capacity utilization and ensures that no one server is overloaded. As a result, the existing infrastructure is configured to maximize activity, optimize resource allocation, and provide smallest amount of response time.

Conventional load balancing solutions are based on data center hardware and employ sophisticated IT installation, and customization. Conventional load balancing technology is often achieved by specific hardware that is usually very expensive and lacks sufficient flexibility. It is also vulnerable to frequent failure and would be restricted in virtualization environments.

In case of load-balancing problem, current solutions include:

Manually moving applications between servers when a spike of load occurs. Disadvantage of this approach is that individual servers are vulnerable to spikes in load of any of their hosted applications, which may result in all of the hosted applications on a server to crash, and the need for manual intervention which can delay recovery time significantly.

Isolating applications which are generating large amounts of load on the system with operation-system level constraints. Disadvantage of this approach is that if an application experiences a spike in load, that application is effectively taken offline (or made to run very slowly) until it is manually moved to another server.

The use of load balancer appliances (hardware or software) in conjunction with stateless or semi-stateless application servers and a shared storage backend (SAN), in order to distribute the load of the applications across multiple servers is referred as a "classical cluster". Clustering is connecting two or more computers together in such a way that they behave like a single computer. Clustering is used for parallel processing, for load balancing, and for fault tolerance. Goal of a cluster is to make it possible to share a computing load over several systems without either the users or system administrators needing to know that more than one system is involved. If any component in the system, hardware or software fails, the user may see degraded performance, but will not lose access to the service. Ideally, if more processing power is needed, the system administrator simply "plugs in a new component", and the performance of the clustered system as a whole improves. Disadvantages to this approach is that the SAN itself acts as a single point of failure, failures of which may be catastrophic, and that such a cluster cannot operate across geographically diverse locations. Further disadvantages to a classical cluster include needing to implement complex solutions for the "split-brain" problem, where servers become disconnected from each other but not from the shared storage medium, which can cause data corruption, requiring administrators to sets up quorum, fencing to physically power off a server if it becomes unresponsive.

Cloud hosting systems provide computing resources for companies and users to deploy and manage their software applications and data storage remotely in a cloud infrastructure. These applications and data storage services are often provided as web-based services for usage by the public and private end users. Typical cloud infrastructures consist of interconnected nodes of computing devices, typically servers that host computing resources for such applications and data storage. Each of the host computing devices may be partitioned into multiple independently-operating instances of computing nodes, which are isolated from other instances of computing nodes residing on a common hardware of the computing devices. Load balancing in the cloud is a process that distributes workloads and calculates resources in a cloud computing environment. With load balancing, organizations can manage application or workload requests by allocating resources to multiple computers, networks, or servers. Numerous types of Load balancing in Cloud environment are available including Software-defined networking (SDN), User Datagram Protocol (UDP), Transmission control protocol (TCP), Server Load Balancing (SLB), Virtual, Load Balancer as a Service (LBaaS) etc., Out of the above, Virtualization, which refers to the abstraction of computer resources from their hardware or software-based physical constructs, it creates an abstract intermediate layer, separating the upper layer applications from the underlying infrastructure. One approach to virtualization is based on one or more virtual machines (VMs), each of which is a software implementation of a computer that executes programs or applications as if it was a physical computer. A virtual machine operates like a physical computer and contains, its own virtual software-based central processing unit (CPU), random access memory (RAM), hard disk storage, and network interface card (NIC). Each virtual machine in a virtualization system generally runs its own guest operating system (OS), and the virtual machines generally share the underlying physical machine resources of the system.

There are many potential benefits to operating in a virtualization system, for example, by permitting the sharing of hardware among applications workloads, virtualization can be used for improving resource utilization and reducing the need of excess resources to absorb peak traffic. Virtualization is also used to improve the availability and robustness of applications, by shifting workloads among servers to handle fail-over situations. Similarly, virtualization provides flexible partitioning of applications, deployment, and operations. Notwithstanding the potential benefits, operating in a virtualization system presents several challenges and potential pitfalls, including significant operation management challenges and cause some difficulties to the upper layer applications for the effective use of resources.

An alternative virtualization technique found are container systems. Container systems provide an operating-system level virtualization in which the kernel of an operating system can allow for multiple isolated user space instances. Container is based on server virtualization that uses a shared operating system. Rather than virtualizing hardware and creating whole virtual machines, containers run atop the shared operating system kernel and file system that looks and feels like a complete, isolated instance of the operating system. Containers are instances of such servers that provide an operating-system level isolation and use the operating system's native system call interface. Thus, containers do not employ emulation or simulation of the underlying hardware nor employ similar software interfaces to those of virtual machines. One distinction between a container and a virtual machine is that multiple application containers (e.g. each corresponding to a different application) may be deployed over a single OS, whereas, each VM typically runs a separate OS. Thus, containers are often less resource intensive and may facilitate better utilization of underlying host hardware resources. Since containers are based on shared operating systems, unlike virtual machines, they do not require guest operating systems and thus avoid some of the overhead of virtual machines. Deploying and configuring a container may involve setting data structures to map container resources to server and operating system resources. Therefore, deploying and configuring a container can often be accomplished in seconds; deploying a virtual machine and a guest OS and configuring both to run an application may require substantially more time. Studies have shown that container-virtualization can offer significant efficiencies and performance advantages over virtual-machines Container systems, like virtual machine systems, provide means for abstracting computer resources (or compute resources), controlling and isolating the allocations of these resources to applications, distributing and migrating applications flexibly, among multiple servers, to support scalable, highly-available, robust and efficient datacenter (DC) and cloud systems. The container system provides means to provision containers, allocate and control the resources available to a container, deploy and execute applications in the container, and facilitate full use of the container resources by such containerized applications, while isolating them from other applications, sharing the underlying resources. When a containerized application accesses a virtualized container resource (e.g., CPU, memory, storage I/O, Network I/O), the container system maps this access to a direct access of the underlying real resource. With the growing usage and popularity, the containers were a replacement of the Virtual Machines in the public and private cloud operations. However, application containers that run on a single host are susceptible to host failure, which may result in failure of the entire software system that the application containers constitute. In addition, application containers that run on a single host may also be limited by host resource constraints. Thus, many systems run on a collection of container hosts termed "container clusters." Docker Swarm emerged as a popular choice for managing and scheduling the containers in the cloud. However, the Swarm scheduler does not intelligently decide the placement of containers in the cluster resulting in higher resource contention and performance degradation. Following are the prior-art discussing the container based deployment.

U.S. patent Ser. No. 10/225,335 relates to apparatus, systems and methods for container based service deployment facilitating distributed orchestration and deployment of a single instance of a distributed computing application over a plurality of clouds and container clusters, including container clusters provided through a Container as a Service (CaaS) offering. In some embodiments, system and pattern constructs associated with a hybrid distributed multi-tier application may be used to obtain an infrastructure independent representation of the distributed multi-tier application. The infrastructure independent representation may comprise a representation of an underlying pattern of resource utilization of the application. Further, the underlying pattern of resource utilization of the application may be neither cloud specific nor container cluster specific.

US patent application 20170199770 describes methods and systems for load balancing of a host-computing device. A supervisory computing device receives one or more resource usage statistics of container instances operating on a first host-computing device. The device determines whether (i) the resource usage statistics of each of the containers, which are linked a given user account, exceeds (ii) a set of threshold values associated with the given user account. Responsive to the determination that the compared resource usage statistics exceeds a given threshold value, the device transmits a command (e.g., API function) to the first host computing device to migrate the container associated with the compared resource usage statistics from the first host computing device to a second host computing device selected from a group of host computing devices. The migration occurs with a guaranteed minimum downtime of the web-services being provided by the container.

US Patent application 20190286619 relates to a system for live-migration and automated recovery of applications in a distributed system. It provides method and apparatus for distribution of applications amongst a number of servers, ensuring that changes to application data on a master for that application are asynchronously replicated to a number of slaves for that application. Servers may be located in geographically diverse locations; the present disclosure permits data replication over high-latency and lossy network connections and failure-tolerance under hardware and network failure conditions. Access to applications is mediated by a distributed protocol handler which allows any request for any application to be addressed to any server, and which, when working in tandem with the replication system, pauses connections momentarily to allow seamless, consistent live-migration of applications and their state between servers. Additionally, a system which controls the aforementioned live-migration based on dynamic measurement of load generated by each application and the topological preferences of each application, in order to automatically keep servers at an optimum utilization level.

Another U.S. Pat. No. 9,164,808 discloses a Virtual container for network systems. A first server is configured to receive performance data associated with a first virtual machine. The first virtual machine may be capable of communicating with a client device. The first server is further configured to determine whether the first virtual machine is overloaded based on the performance data, and send an instruction to a second server to generate a second virtual machine based on determining that the first virtual machine is overloaded. The second virtual machine may be capable of communicating with the client device. The first server is further configured to instruct the second virtual machine to communicate with the client device to reduce network load associated with the first virtual machine.

In view of the foregoing, a need exists for an improved resource management system and method for optimized container node placement in an effort to overcome the aforementioned obstacles and deficiencies of conventional load balancing systems. Existing load balancing and scaling methods improve the efficiency and performance of distributed computing resources by allocating the workload and end-user usages among the interconnected physical computing resources to prevent any given resource (e.g., of a host computing device) and the connectivity with such resources from being overloaded. Such methods are implemented using multiple containers in order to share the workload and usage. Therefore there is a need for load balancing and scaling with container-based isolation that improves the density of host accounts for a given set of physical computing resources. There is also a need to provide more efficient failover operations The present disclosure provides a method for optimizing load balance in the cluster by effectively migrating docker containers and a load balancer framework that leverages the container runtime metrics to decide the optimal container to node placement in the cluster. The framework provides a method of synchronizing the container file system, by leveraging the use of private container registry. The framework further incorporates fly container migration in which migrating a container involves check-pointing it on the host node and restoring it on the target node. Check-pointing involves freezing/saving the process tree, memory pages and file system of the container. The present disclosure provides a load balancer framework for synchronizing the container file system that addresses the limitations of default scheduling policies of the Swarm scheduler. The present disclosure provides container migration based on run-time/real-time metrics of the computing host machine in the virtual environment. Load balancing is performed by optimized allocation of nodes in the applications thereby re-balancing the cluster. Further load balancing framework of the present disclosure is scalable to large number of nodes and it leverages the power of graphical processing units (GPU) for making faster scheduling decisions.

Objects of the Present Disclosure

One example object of the present disclosure is to provide a system and method of optimizing load balancing in a cluster by effectively migrating docker containers Another example object of the present disclosure to provide a load balancer framework that leverages the container runtime metrics to decide the optimal container to node placement in the cluster.

It is another example object of the present disclosure to provide a method of synchronizing the container file system, by leveraging the use of private container registry.

Still another example object of the present disclosure is to provide a load balancer framework with fly container migration in which migrating a container involves check-pointing it on the host node and restoring it on the target node.

It is another example object of the present disclosure is to provide a load balancer framework that enables container migration based on run-time/real-time metrics of the computing host machine in the virtual environment.

It is another example object of the present disclosure to provide a load balancer framework wherein load balancing is performed by optimized allocation of nodes in the applications thereby re-balancing the cluster.

Although the present disclosure is mainly designed as a load balancer framework for optimizing load balancing in a cluster, it goes without saying that the present disclosure can be applied and adapted to different scheduling criteria and different workloads environment

SUMMARY OF THE PRESENT DISCLOSURE

The present disclosure provides a method of optimizing load balancing in a cluster by effectively migrating docker containers. The present disclosure also provides a load balancer framework that leverages the container runtime metrics to decide the optimal container to node placement in the cluster.

A method of optimizing load balancing in a cluster by effectively migrating docker containers and leveraging the container runtime metrics to decide the optimal container to node placement in the cluster, comprising steps of: initiating the container migration request; sending instructions to the host node upon receiving the container migration request; check-pointing the container as a collection of files on the persistent storage; fetching the container metadata and transferring it to the target node; transferring the checkpoint data to the target node; synchronizing the associated data storage of container with the target node; replicating the host container at the target node using the container metadata; initiating the container by restoring the process tree on the target node using the container checkpoint data; and termination of the container migration.

In one example embodiment of the present disclosure, method of synchronizing the container file system is performed by leveraging the use of private container registry.

In one example embodiment of the present disclosure, the layers of a docker container including the init layer are pushed to the private registry using the docker push operation. At the target node, pull operation is used to fetch the image. For a container image only the top init layer is modified, keeping the remaining layers intact. The use of registry thereby enables the transfer of only few layer to the target node. The approach considerably reduces the data transfer and speeds up the process of storage synchronization of a container.

In another example embodiment of the present disclosure, scheduling decision are coupled with the task of container migration which involves freezing the running application and check-pointing it as a set of files on the persistent storage.

In an example embodiment, the present disclosure provides an optimized load balancing framework for a cluster which enables effective docker containers migration with check-pointing and synchronization of data storage of container with the target node, comprising of: at least a zookeeper Node, enabling real-time data exchange between various processes of the framework; at least a manager node, responsible for coordinating all the activities of the framework; at least an optimizer, wherein said container runtime metrics from manager nodes are sent to the optimizer for performing optimization and deciding the container to node placement; and a plurality of worker nodes, acting primarily as host for running the containers in the cluster, wherein said each of the worker node is provided with a migration module for issuing migration instruction and enabling checkpoint-restoration operation for the container.

The present disclosure provides a load balancer framework with fly container migration in which migrating a container involves check-pointing it on the host node and restoring it on the target node. The load balancer framework enables container migration based on run-time/real-time metrics of the computing host machine in the virtual environment. In the load balancer framework of the present disclosure load balancing is performed by optimized allocation of nodes in the applications thereby re-balancing the cluster. In addition load balancing framework of the present disclosure is scalable to large number of nodes and it leverages the power of graphical processing units (GPU) for making faster scheduling decisions.

Other features and advantages of embodiments will be apparent from the accompanying drawings and from the detailed description that follows.

Figure 1:
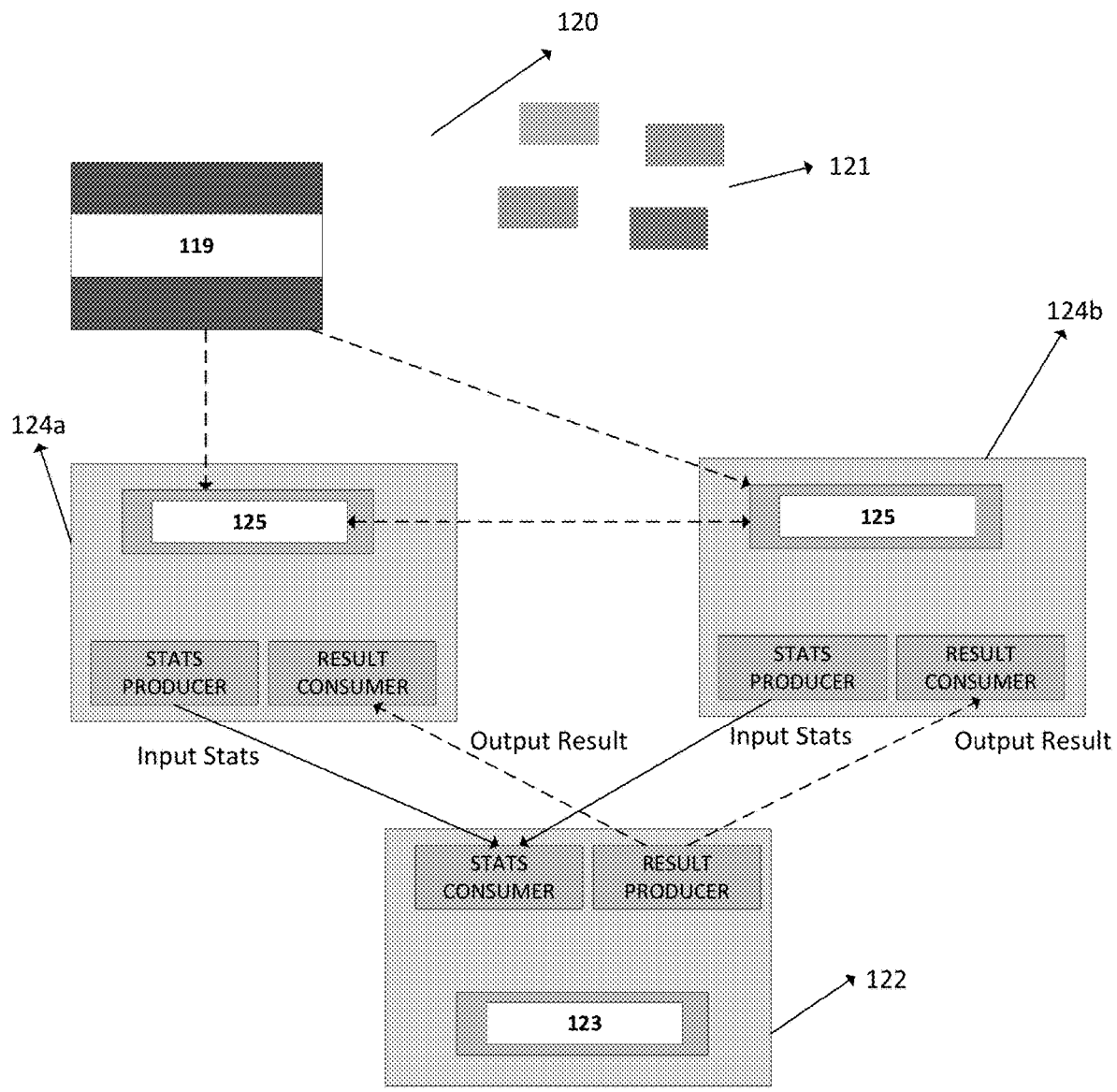
FIG. 1 represent an optimized load balancing framework (120) for a cluster in accordance with the present disclosure which enables effective docker containers migration with check-pointing and synchronization of data storage of container with the target node.

While the present disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the present disclosure.

Hereinafter, preferred embodiments of the present disclosure will be described in detail with reference to the accompanying drawings. Prior to this, terms and words used in the present specification and claims should not be construed as limited to ordinary or dictionary terms, and the inventor should interpret the concept of the term appropriately to describe its own concepts in the best way. The present disclosure should be construed as meaning and concept consistent with the technical idea of the present disclosure based on the principle that it can be defined. Therefore, the embodiments described in this specification and the configurations shown in the drawings are only the most preferred embodiments of the present disclosure and do not represent all the technical ideas of the present disclosure. Therefore, it should be understood that equivalents and modifications are possible.

DETAILED DESCRIPTION OF THE PRESENT DISCLOSURE WITH RESPECT TO THE DRAWINGS

The present disclosure as embodied by "A method for optimizing the load balance in the cluster and a framework thereof" succinctly fulfils the above-mentioned need(s) in the art. The present disclosure has objective(s) arising as a result of the above-mentioned need(s), said objective(s) being enumerated below. In as much as the objective(s) of the disclosure invention are enumerated, it will be obvious to a person skilled in the art that, the enumerated objective(s) are not exhaustive of the present disclosure in its entirety, and are enclosed solely for the purpose of illustration. Further, the present disclosure encloses within its scope and purview, any structural alternative(s) and/or any functional equivalent(s) even though, such structural alternative(s) and/or any functional equivalent(s) are not mentioned explicitly herein or elsewhere, in the present disclosure. The present disclosure therefore encompasses also, any improvisation(s)/modification(s) applied to the structural alternative(s)/functional alternative(s) within its scope and purview. The present disclosure may be embodied in other specific form(s) without departing from the spirit or essential attributes thereof.

Throughout this specification, the use of the word "comprise" and variations such as "comprises" and "comprising" may imply the inclusion of an element or elements not specifically recited.

The present disclosure provides a load balancing framework which is a scalable distributed framework inspired from GAS: GPU assisted scheduling for multicore systems. GAS is extended to a distributed cloud environment where the unit of scheduling is container. The framework of the present disclosure addresses the limitation of swarm scheduler, providing capability to perform on the fly container migration and reduces the shared resource contention. It is essential to re-balance and stabilize the cluster as the default scheduling policies employed by swarm are in total conflict with the resource contention policies. Swarm uses the master-salve architecture to orchestrate containers across multiple nodes.

Figure 3:
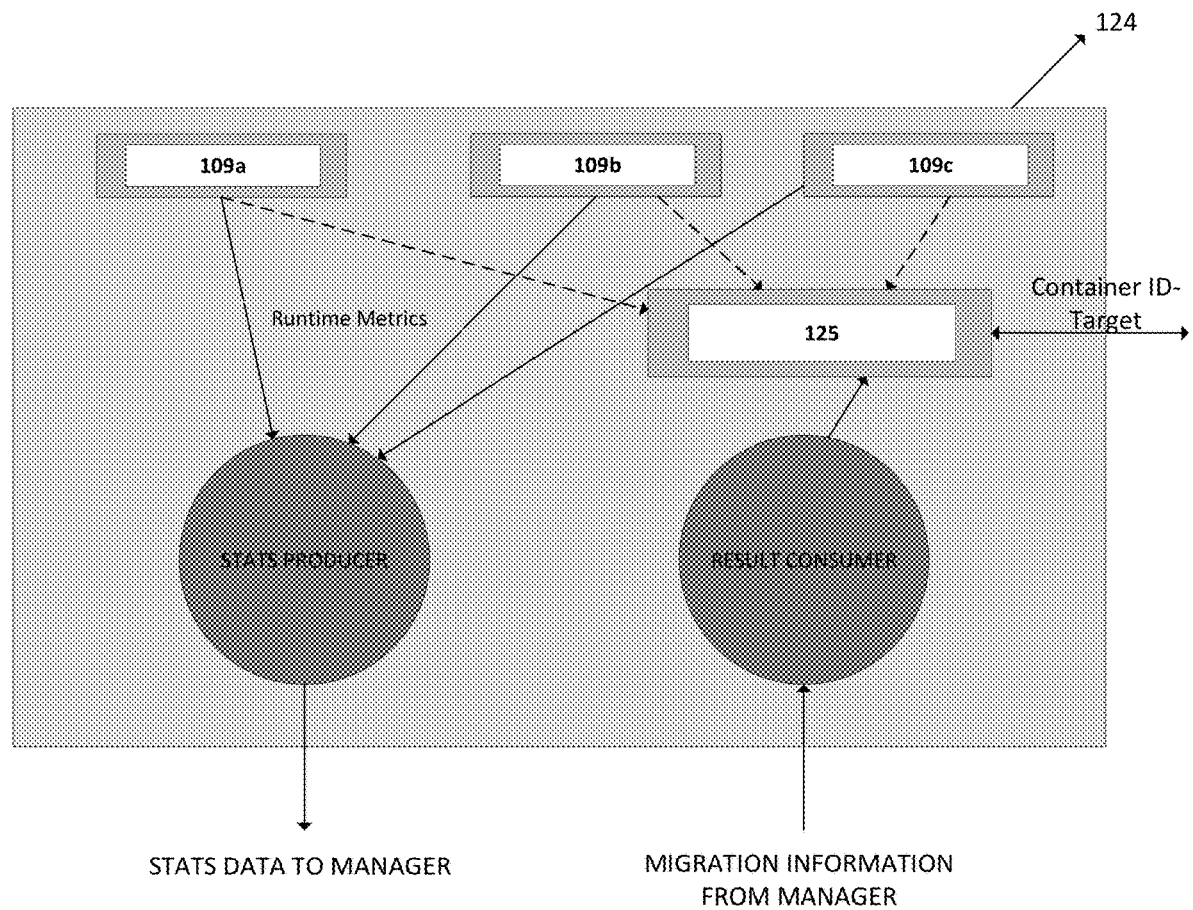
FIG. 3 represents the worker node (124) configuration acting primarily as host for running the containers in the cluster in accordance with the present disclosure.
Figure 7:
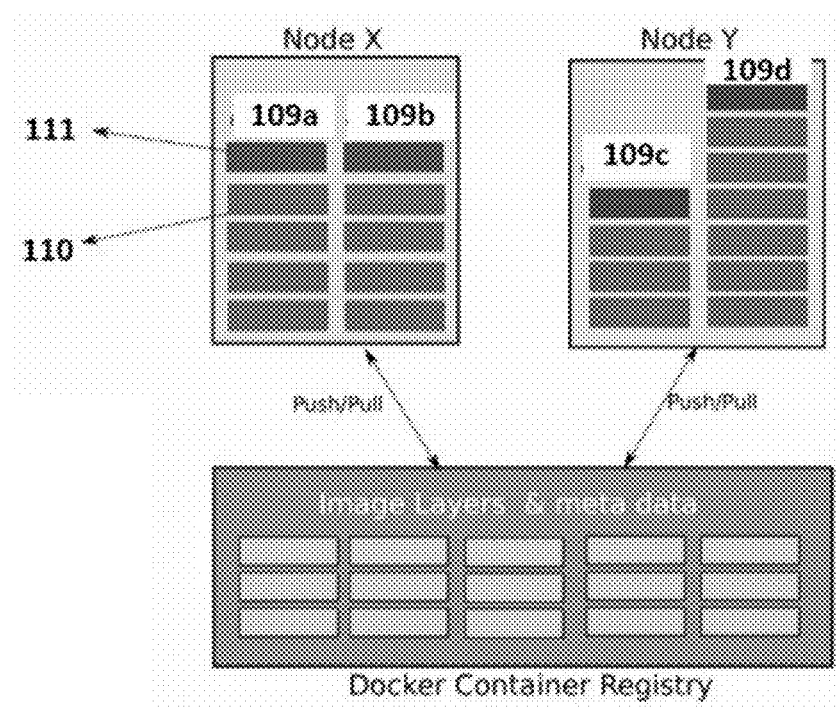
FIG. 7 Shows the Approach 2 of the container migration where the layers of a docker container including the init layer are migrated to the private registry using the docker push/pull operation.

Containers (109a, 109b, 109c, 109d) shown in FIG. 3 are the runtime entities created using Docker Image. Essentially, the image is a stacked collection of layers of the file system. The creation of an image starts with a base layer and with every new command a layer is added on top of the existing layers. The layers of docker image are read-only (110) and therefore cannot be altered. When a container is launched using an image, as shown in FIG. 7, a new thin writable layer (111) called init is created on top of the existing base layers. The init layer does not persist permanently on the disk and gets removed whenever the container is deleted. The init layer is required because any modifications to the file system by the container processes must be committed to the disk.

The default container placement strategy does not intelligently decide the schedule and this can have a significant impact on the performance of the application. For instance, placing containers incurring heavy cache or memory bandwidth on same node. Can degrade the performance. Likewise scheduling containers having high I/O usage on the same node, increases the latency of disk accesses thereby impacting application performance.

The present disclosure provides a method of optimizing load balancing in a cluster by effectively migrating docker containers, comprising steps of:
a. initiating the container migration request;
b. sending instructions to the host node upon receiving the container migration request, wherein instructions includes specifying the container identification and the address of the target node;
c. check-pointing the container as a collection of files on the persistent storage, wherein said container is stopped upon completion of the check-pointing operation;
d. fetching the container metadata and transferring it to the target node;
e. transferring the checkpoint data to the target node, wherein said checkpoint data is transferred in a compressed form;
f. synchronizing the associated data storage of container with the target node, Wherein transferring includes only the modified file system of the container;
g. replicating the host container at the target node using the container metadata, wherein said replication of host container is enabled when the checkpoints and file system of the container are made available at the target node;
h. initiating the container by restoring the process tree on the target node using the container checkpoint data, wherein said restoration is enabled using the docker start with checkpoint attribute; and
i. termination of the container migration.

In one example embodiment of the present disclosure, said check-pointing involves freezing/saving the process tree, memory pages and file system of the container.

In another example embodiment of the present disclosure, said check-pointing of container is performed using docker checkpoint create operation, wherein said docker performs the check-pointing of the process using CRIU dump, and wherein said CRIU dumps the process tree of container along with the memory pages, page-map information, file descriptor information, shared memory.

In another example embodiment of the present disclosure, said container metadata includes information about the mount points, exposed ports, entry-point instructions and the allocated resources including CPU quota, memory limits, I/O bandwidth.

In another example embodiment of the present disclosure, said checkpoint data requires a large storage space, wherein higher the memory footprint of the container higher is the size of the checkpoint data of the container. Transferring the checkpoint data across network involves high bandwidth and increase transfer time.

In another example embodiment of the present disclosure, said checkpoint data is transferred in a compressed tar file form, wherein said compression of checkpoint data reduces overall size of the checkpoint size.

In another example embodiment of the present disclosure, said modification to the file system are done to the newly created init layer of the container. A private registry is created to store the container images, wherein said registry is a collection of files and directories of each layer of the docker image.

In another example embodiment of the present disclosure, said container stops after transferring the checkpoint data to the target node, wherein said cessation of the container retains the file system without any alteration.

Figure 5:
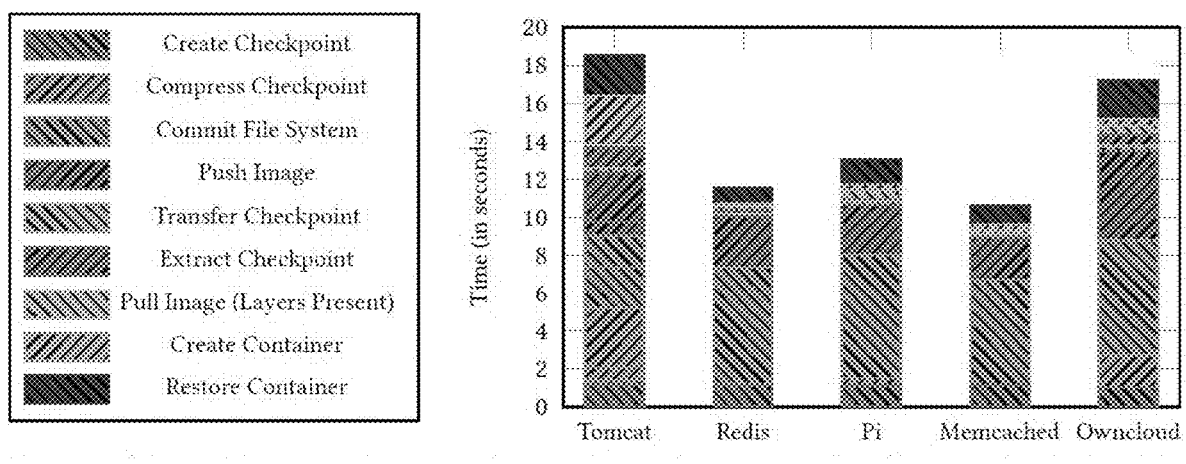
FIG. 5 represents a graph showing the time consumed for performing each step of container migration for popular docker images by implementing the optimized load balancing method in a cluster by effectively migrating docker containers in accordance with the present disclosure.

In another example embodiment of the present disclosure, said docker containers are made of layered file system, as shown in FIG. 5.

Figure 6:
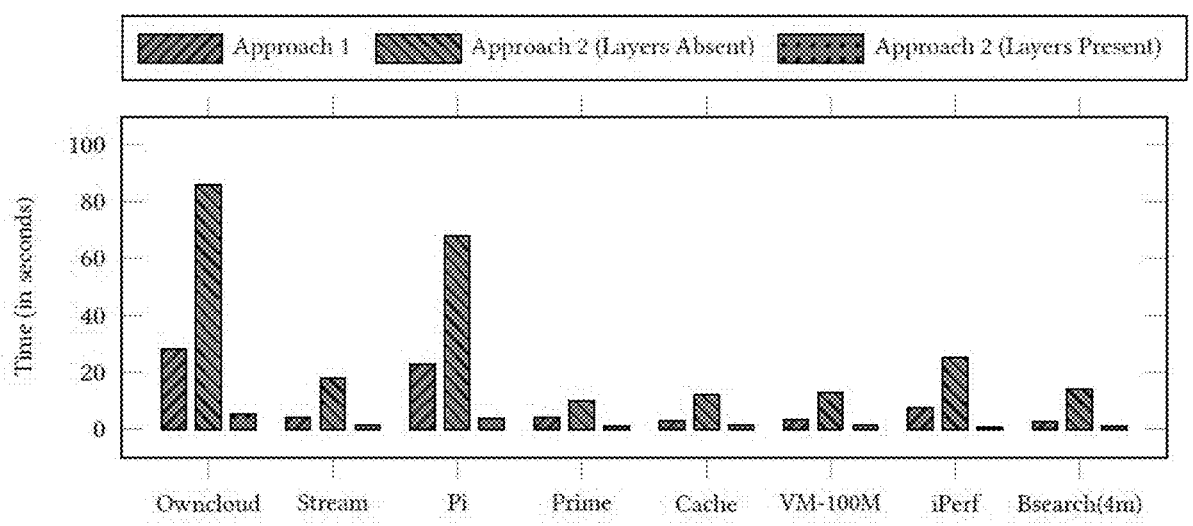
FIG. 6 provides a graph comparing the two approaches used for synchronizing the file system of container. Approach 1 exports the file system of container as a compressed file. Approach 2 where layers are absent, shows the time taken to commit file system when no image layer is present in private registry. Approach 2 where layers are present, shows the time taken to commit file system when container image layers are present in the private registry except the init layer.

In another example embodiment of the present another example, the layers of a docker container including the init layer are pushed to the private registry using the docker push operation. During the push operation, the docker daemon checks the manifest files to verify the presence of the image layers in the registry. If the layers are missing the push operation transfers the layers and updates the manifest file. However if the image layers are already present no actual data transfer occurs. At the target node, pull operation is used to fetch the image. The docker daemon at the target node checks the manifest file for missing image layers. If the layers are not present at the target node, the pull operation fetches them from the registry and updates the manifest files. For a container image only the top init layer is modified, keeping the remaining layers intact. The use of registry thereby enables the transfer of only few layer to the target node. The approach considerably reduces the data transfer and speeds up the process of storage synchronization of a container, as shown in FIG. 6.

In another example embodiment of the present disclosure, the layers of an image are missing in the private registry. When the container is migrated for the first time, all the image layers gets transferred to the registry. However the next time a container relocates, only the top init layer is transferred to the registry as the remaining image layers are already present. Therefore with time as registry gets filled up with the image layers, fewer layers get transferred every time a container migrates.

In another example embodiment of the present disclosure, Commit operation is used to create a new docker image of a running container.

In another example embodiment of the present disclosure, Scheduling decision are coupled with the task of container migration which involves freezing the running application and check-pointing it as a set of files on the persistent storage.

Check-pointing is a process that involves saving all essential runtime attributes of process, so that the process can be restarted again. It includes saving the process tree, threads, open files, network sockets, memory maps, file descriptors, pages, intermediate values in registers, mount-points, etc. checkpoint/restore in userspace (CRIU) is a tool developed for linux operating system check-pointing and restoring the normal processes. However, there are certain limitations of CRIU which restricts its seamless usage for the docker containers. CRIU does not checkpoint the file system of a container. Consider a container performing write operations on the file system. These write operations are performed on the top init layer, causing changes to the file pointers. The file pointers are saved by CRIU during checkpoint operation. However, the files that are modified are not persisted to the disk. The modified files are part of a temporary init layer of the container image. As a result during the process restoration, the file pointers are recovered, whereas the files are not. The results in process restoration errors and the container fails to restart. Therefore, to completely restore a container on the target node, it is critical to checkpoint the container along with the file system synchronization.

Docker swarm employs the spread strategy to schedule containers in the cluster. This approach aims to balance the utilization of the worker nodes by deploying an equal number of containers on all nodes. However, the strategy chooses worker node on a random basis whenever there are equal number of active containers across all the worker nodes. Evidently the spread strategy simply transforms to the Random strategy resulting in cluster instability. Therefore it becomes critical to re-balance and stabilize the cluster. Further, if the containers are killed or stopped accidentally, the swarm manager relaunches them based on its container restart policy. This erratic behavior of the manager results in a significant loss of data and computation. The re-launching can have notable performance impact for containers running applications where pre-processing is required. Restarting the containers in a cluster without preserving the computation, can lead to significant performance penalty, lesser availability and can even lead to the violation of the service level agreements (SLAs). The container orchestration tools should, therefore encapsulate the container migration as a preliminary service.

Figure 2:
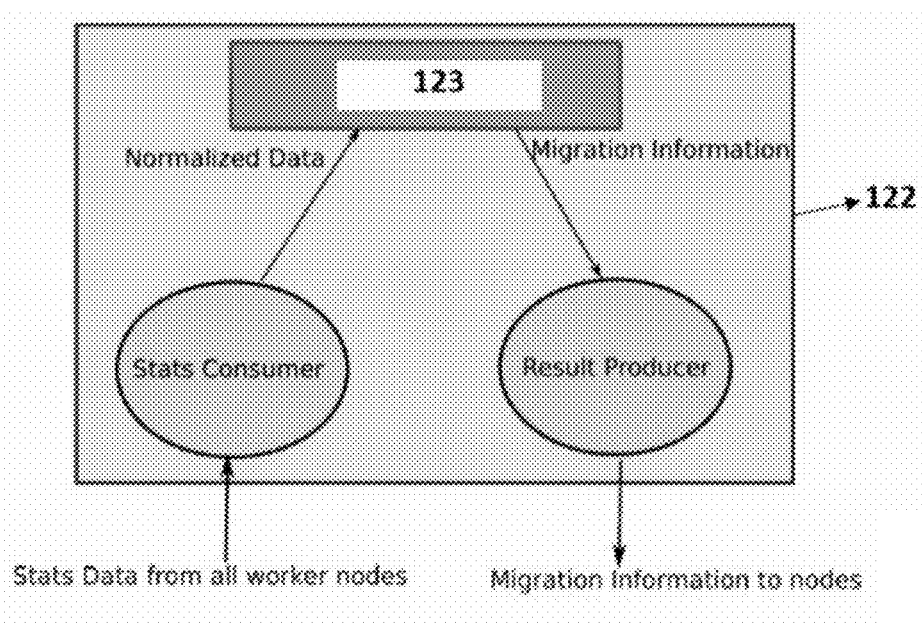
FIG. 2 represents the manager node (122) configuration provided with an optimizer (123), responsible for coordinating all the activities of the framework and performing optimization and deciding the container to node placement in accordance with the present disclosure.

In another example embodiment and as shown in FIG. 1, the present disclosure provides an optimized load balancing framework (120) for a cluster which enables effective docker containers migration with check-pointing and synchronization of data storage of container with the target node, comprising of: a container registry (119), for storing the docker image data; at least a zookeeper Node (121), enabling real-time data exchange between various processes of the framework, wherein said zookeeper Node provides interaction between multiple processes of the manager and worker nodes wherein some processes generate the data and others consume it; at least a manager node (122), responsible for coordinating all the activities of the framework, wherein said manager node periodically polls the worker node for container runtime metrics; at least an optimizer (123), wherein said container runtime metrics from manager nodes are sent to the optimizer for performing optimization and deciding the container to node placement as shown in FIG. 2; and a plurality of worker nodes (124a, 124b), acting primarily as host for running the containers in the cluster, wherein said worker node fetches the container metadata, runtime metrics, worker node configuration and end result from the said manager node, wherein said each of the worker node is provided with a migration module (125) for issuing migration instruction and enabling checkpoint-restoration operation for the container, wherein said migration module receives information including container ID and target node ID, and performs container migration to the target node.

In another example embodiment of the present disclosure, said zookeeper node (121) uses Kafka messaging system to exchange data between various processes of the framework, Wherein Kafka is a distributed real-time streaming platform providing capabilities to publish and subscribe to a stream of messages in a fault-tolerant, scalable and durable way. Wherein said kafka messaging system generate and consume streams of messages in real time. Kafka internally uses zookeeper to store and manage the kafka meta-data.

In another example embodiment of the present disclosure, said optimizer (123) is modeled with primary container placement problem as an optimization problem with runtime metrics of the container as its input. Genetic algorithm is provided as an optimization module to find the most stable and optimal container to node placement. It is based on the evolutionary computation, intimidating the process of biological reproduction and natural selection of fittest individual.

In another example embodiment of the present disclosure, said containers are profiled using a wide range of runtime metrics, wherein said runtime metrics includes CPU, memory, block I/O, network etc.

In another example embodiment of the present disclosure, said container metadata includes container ID, node ID, resources allocated to the container, etc.

Figure 4:
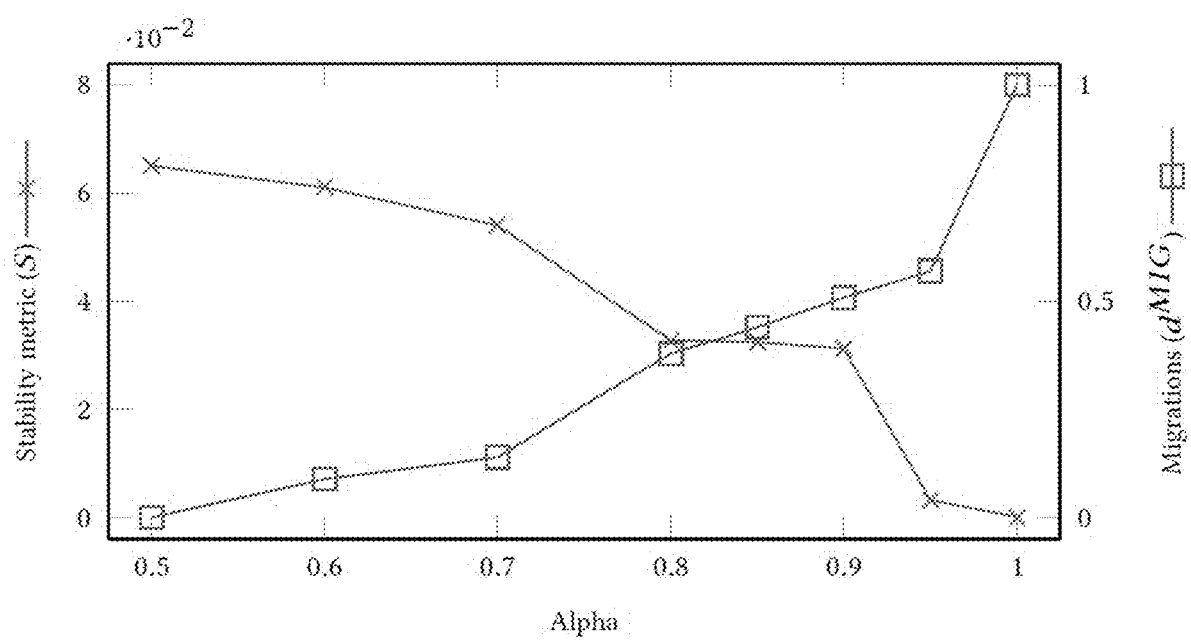
FIG. 4 represents a graph showing the trade-off between stability S and Migrations $d_n^{MIG}$ by varying $\alpha$ the tunable parameter, this indicates the trade-off between variance and migrations.

In another example embodiment of the present disclosure, stability metric S is defined as variance of the mean utilization of resources across all nodes in a cluster. The fitness function used in the genetic algorithm is defined as:

$$f = a * S_n + (1-a) * d_n^{MIG}$$

Where $S_n$ represents the normalized stability and $d_n^{MIG}$ represents the normalized migrations and alpha is the tunable parameter, which indicates the trade-off between variance and migrations. If alpha is 0, the optimization function would only attempt to reduce variance, causing higher migrations. If alpha is 1, the optimization function would only reduce migrations at the cost of higher variance. Therefore we need to find the optimal value of alpha, to achieve reduced variance with minimum migrations. FIG. 4 shows the trade-off between stability metric and migrations by varying the value of alpha.

Example

Figure 8A:
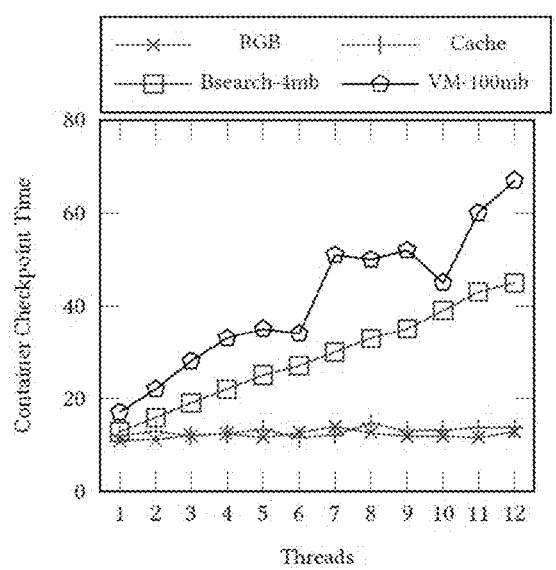
FIG. 8a provides a graph showing the effect of number of threads on the checkpoint time of various containers.
Figure 8B:
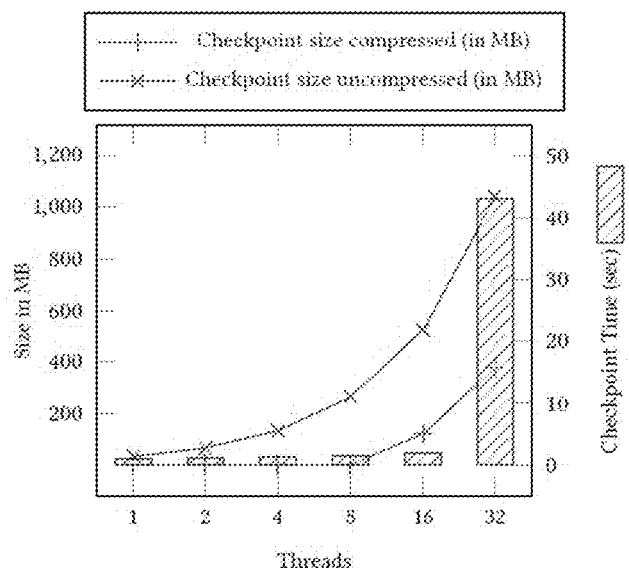
FIG. 8b provides a graph showing the variation of checkpoint time and checkpoint data size with increase in no of threads for Qsort program (Stress-NG Benchmark).
Figure 11:
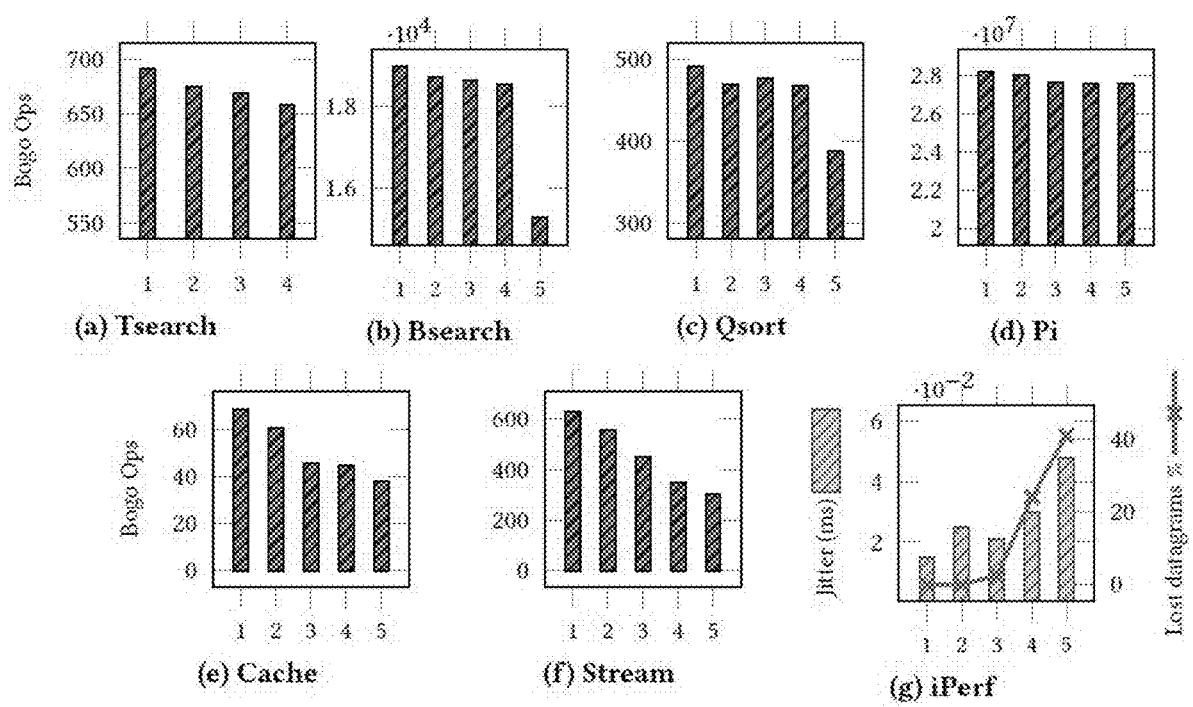
FIG. 11 provides graphs showing the performance degradation when multiple containers of same application are launched on a single node for stress-NG and i-Perf benchmark, x-axis denotes the number of containers and y-axis denotes the throughput in Bogos Ops.

This example provides how the optimized load balancing framework of the present disclosure is configured to achieve performance improvement as illustrated in FIG. 8a and FIG. 8b. The present approach uses stress-NG and iperf benchmark. Stress-NG benchmark is a tool that stresses and measures various subsystems such as CPU, memory, cache, disks etc. iPerf is a tool, which measure end to end network bandwidth. The iPerf client is configured with varying request rate to stress the iPerf server and network components of the system. To stress the system resources, the following workload mix of programs of stress-NG and iPerf benchmark programs were chosen as shown in table 1. The benchmark programs are run as docker container in the swarm cluster. Each container is run for a total of 120 seconds. Timeout was used to control the process execution time. The throughput results are shown in FIG. 11 by benchmark using bogos operation per second. It provides the rough notion of performance and is not comparable across different stressors programs.

TABLE 1

| Workload | Program 1 | Program 2 | Program 3 | Program 4 |
| --- | --- | --- | --- | --- |
| W1 | RGB | Bsearch (4M) | RGB | Bsearch (4M) |
| W2 | Prime | Bsearch (4M) | RGB | Cache |
| W3 | Cache | Pi | Cache | Prime |
| W4 | Prime | Stream | Queens | Cache |
| W5 | psi | Stream | Prime | Stream |
| W6 | Prime | Bsearch (4M) | Crypt | Cache |
| W7 | Crypt | Tsearch (4M) | Queens | Cache |
| W8 | iPerf (100 Mbps) | Stream | iPerf (150 Mbps) | Cache |
| W9 | iPerf (100 Mbps) | VM (50 MBytes) | iPerf (150 Mbps) | Stream |
| W10 | iPerf (100 Mbps) | VM (50 MBytes) | Queens | Cache |

The optimized load balancing framework setup consists of nodes (virtual machines) that runs on BOSS MOOL (minimalistic oriented Linux) operating system. It is generic enough to run on other linux distributions. Table 2 shows the system configuration for evaluating the load balancing framework. The benchmark programs are run with replication factor. The containers are launched in the same order as shown in the table 1. For instance in W1, seven replicas of RGB containers are launched followed by seven replicas of Bsearch (4m) and so on. Restart condition none is used for launching containers as services in the cluster. The tweak is done to prevent swarm from restarting the containers, as the containers are stopped during the checkpoint operation. Then the optimized load balancing framework of the present disclosure is compared with the default docker swarm scheduling.

TABLE 2

| Category | Description |
| --- | --- |
| Manager node | 1 |
| Worker nodes | 14 |
| Kafka Broker Nodes | 2 |
| Zookeeper Node | 2 |
| Private Registry | 1 |
| Linux Version | Linux BOSS 3.16.0-4-amd64 [5] |
| Docker | Experimental Version: 1:13.0 |
| Kafka | Version: 2.11 |
| CRIU | Version: 3.4 |
| Nodes Configuration | 4 Cores and 4 GB memory |

Figure 9:
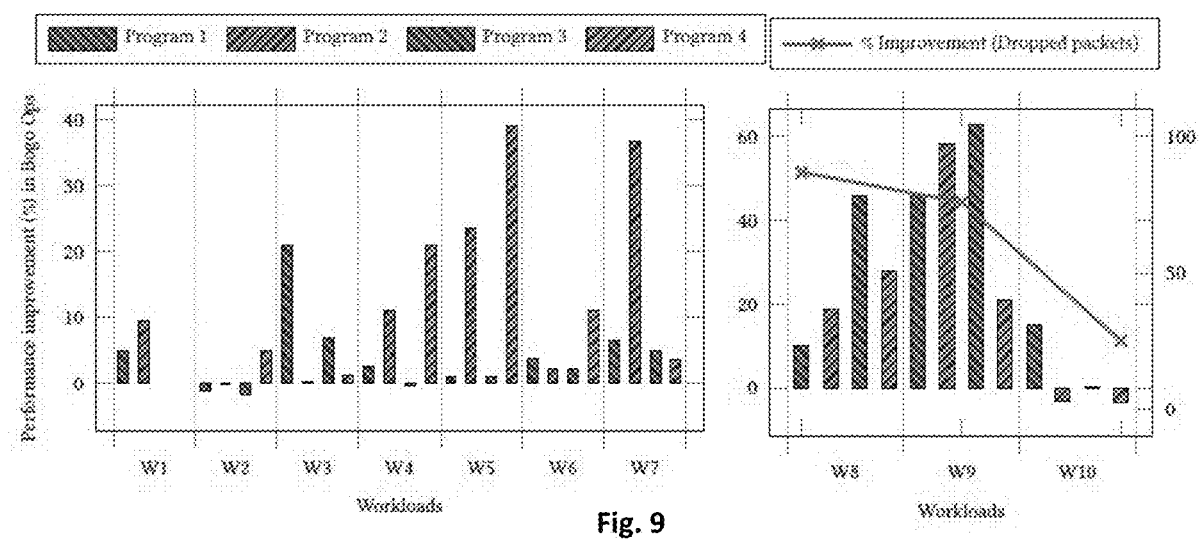
FIG. 9 provides a graph showing the performance improvement in terms of Bogo Ops with default docker Swarm scheduler.
Figure 10:
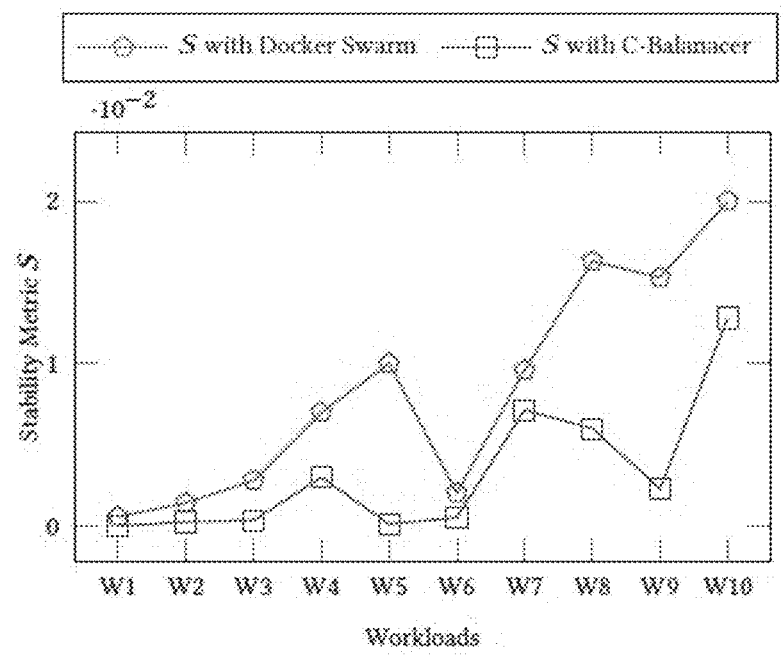
FIG. 10 provides a graph showing the comparison of stability metric S for docker swarm and optimized a load balancer framework in accordance with the present disclosure.

FIG. 9 shows the performance improvement for each of the workload mixes. FIG. 10 analyses the stability metric S for workload mixes using docker swarm and optimized load balancing framework of the present disclosure. The stability metric S represents the variance of the resource utilization in the cluster. Maximum average performance improvement of 58% was observed for the workload mix W9. The improvement is attributed to a significant decrease of around 85% in the value of S. The workloads that showed a lesser reduction in S value, also show lesser performance improvement.

It was also observed an overall reduction of 60% on average in the value of S across all workloads. The decrease in S is paramount as it substantially reduces the resource contention, thereby stabilizing the cluster. It is also observed that the memory, cache and network intensive container applications show a tremendous performance improvement as against the CPU intensive container application. This is evident as the resource contention caused due memory, cache and network exceeds far more than that of a CPU. Additionally for network containers the change in the percentage of dropped packets was evaluated with the load balancing framework of the present disclosure. A maximum reduction of about 58% in the number of dropped packets was achieved by the load balancing framework of the present disclosure, as against the docker swarm scheduler.

It will be apparent to a person skilled in the art that the above description is for illustrative purposes only and should not be considered as limiting. Various modifications, additions, alterations, and improvements without deviating from the spirit and the scope of the present disclosure may be made by a person skilled in the art.

We claim:

1. A method of optimizing load balancing in a cluster, by migrating docker containers and leveraging container runtime metrics to determine an optimal container to node placement in the cluster, comprising:
    initiating a container migration request;
    sending instructions to a host node upon receiving the container migration request, wherein the instructions include specifying an identification of a container and an address of a target node;
    check-pointing the container as a collection of files on a persistent storage, wherein said container is stopped upon completion of the check-pointing;
    fetching a container metadata and transferring the container metadata to the target node;
    transferring checkpoint data to the target node, wherein said checkpoint data is obtained by performing the check-pointing;
    synchronizing an associated data storage of container with the target node, wherein the transferring includes only a modified file system of the container;
    replicating a host container at the target node using the container metadata, wherein said replication of the host container is enabled when the checkpoint data and the modified file system of the container are made available at the target node;
    initiating the container as the host container by restoring a process tree on the target node using the checkpoint data, wherein said restoration is enabled using a docker start operation with checkpoint attribute; and
    terminating the container migration request, wherein the docker containers are made of layered file systems.

2. The method of optimizing load balancing in a cluster, as claimed in claim 1, wherein said check-pointing involves one or more of freezing and saving the process tree, memory pages and a file system of the container.

3. The method of optimizing load balancing in a cluster, as claimed in claim 1, wherein said check-pointing of the container is performed using docker checkpoint create operation.

4. The method of optimizing load balancing in a cluster, as claimed in claim 2, wherein a docker performs the check-pointing of the process tree using CheckPoint and Restore In Userspace (CRIU) dump, wherein said CRIU dumps the process tree of container along with one or more of the memory pages, page-map information, file descriptor information, and shared memory.

5. The method of optimizing load balancing in a cluster, as claimed in claim 1, wherein said container metadata includes information about one or more of mount points, exposed ports, entry-point instructions and allocated resources including Central Processing Unit (CPU) quota, memory limits, and I/O bandwidth.

6. The method of optimizing load balancing in a cluster, as claimed in claim 1, wherein said checkpoint data is transferred in a compressed file form.

7. The method of optimizing load balancing in a cluster, as claimed in claim 1, wherein a file system is modified by modifying newly created init layer of the container.

8. The method of optimizing load balancing in a cluster, as claimed in claim 1, wherein container images are stored in a newly created private registry, wherein said registry is a collection of files and directories of each layer of a docker image.

9. The method of optimizing load balancing in a cluster, as claimed in claim 1, said container stops after transferring the checkpoint data to the target node, wherein stopping of the container retains a file system without any alteration.

10. The method of optimizing load balancing in a cluster, as claimed in claim 1, wherein layers of a docker container including an init layer are pushed to a private registry using a docker push operation, comprising:
 checking manifest files using a docker daemon to verify presence of the layers in the private registry;
 transferring the layers and updating the manifest files correspondingly if the layers are missing or no data transfer occurs if the layers are already present;
 fetching an image at the target node using a pull operation;
 checking the manifest files using the docker daemon to verify missing layers at the target node; and
 fetching the layers from the private registry and updating the manifest files, if the layers are not present at the target node, wherein for a container image only the init layer is modified.

11. The method of optimizing load balancing in a cluster, as claimed in claim 1, wherein first time migration of the container involves a transfer of all image layers to a private registry if layers of an image are missing in the private registry, wherein
 subsequent migration of the container involves a transfer of only the init layer to the registry.

12. The method of optimizing load balancing in a cluster, as claimed in claim 1, wherein commit operation is used to create a new docker image of a running container.

13. An optimized load balancing system for a cluster which enables docker containers migration with checkpointing and synchronization of data storage of a container with a target node, comprising:
 a container memory configured to store docker image data of the container;
 at least a zookeeper Node including one or more respective processors configured to execute corresponding computer-readable instructions to enable real-time data exchange between various processes of the optimized load balancing system, wherein said zookeeper Node is configured to provide an interaction between multiple processes of manager and worker nodes wherein at least some of the processes generate the data and some other ones of the processes consume the data;
 at least a manager node including one or more respective processors configured to execute corresponding computer-readable instructions to coordinate activities of the system, wherein said manager node is configured to periodically polls at least one of the worker nodes for container runtime metrics;
 at least an optimizer provided in the manager node, wherein said container runtime metrics from the manager node are sent to the optimizer to perform optimization and determine container to node placement; and
 a plurality of worker nodes including one or more respective processors configured to execute corresponding computer-readable instructions to function as hosts for running the containers in the cluster, wherein at least one of the plurality of worker nodes is configured to fetch container metadata, runtime metrics, worker node configuration and end result from said manager node, wherein each of the plurality of worker nodes is provided with a migration module configured to issue migration instruction and enabling checkpoint-restoration operation for the container, wherein said migration module is configured to receive information including container ID and target node ID, and is configured to perform container migration to the target node.

14. The optimized load balancing system, as claimed in claim 13, wherein said zookeeper node is configured to use distributed real-time streaming platform to exchange data between various processes of the framework in a fault-tolerant, scalable and durable manner.

15. The optimized load balancing system, as claimed in claim 13, wherein said zookeeper node is configured to use kafka messaging system to generate and consume streams of messages in real time, wherein Kafka internally uses zookeeper to store and manage corresponding Kafka metadata.

16. The optimized load balancing system, as claimed in claim 13, wherein said optimizer is modeled with primary container placement as an optimization problem with runtime metrics of the container as input, wherein an optimization module is provided with a genetic algorithm so as to define most stable and optimal container to node placement among all possible container to node placements.

17. The optimized load balancing system, as claimed in claim 13, wherein said containers are profiled using runtime metrics including Central Processing Unit (CPU), memory, block I/O, and network.

18. The optimized load balancing system, as claimed in claim 13, wherein said container metadata includes container ID, node ID, and resources allocated to the container.

\* \* \* \* \*